Patented July 3, 1934

1,964,781

UNITED STATES PATENT OFFICE 1,964,781

PROCESS FOR SEPARATING GOLD AND ANTIMONY CONTAINED IN ANTIMONY SULPHIDE ORES

Henry William Coupe Annable, Port Elizabeth, Union of South Africa, assignor to The Ferro Alloy Company of Africa Limited, Port Elizabeth, Union of South Africa No Drawing. Application August 30, 1930, Serial No 479,075. In Great Britain January 27, 1930

7 Claims. (Cl. 75—64)

This invention relates to a process for separating gold and antimony contained in sulphide of antimony ores, antimony mattes and other antimony ores, and has for its object to provide a novel and efficient means for separating the metals from their ores.

According to the invention the raw ore, matte or a concentrate of the ore is crushed to a fine state of subdivision and then intimately mixed with certain of the sulphates or bisulphates of the alkali or alkaline earth metals. This mixture is then heated in a suitable furnace in which the admission of air and the temperature may be regulated within certain limits. The mixture is thus heated until all sulphides have been completely oxidized, whereupon the mass is withdrawn from the furnace and treated with water to dissolve and leach out the resulting soluble constituents, after which the remaining roasted mass is treated with mercury to dissolve out the gold content present, which is subsequently recovered from the amalgam by known methods. The water leached mass may be treated by other known processes for the recovery of the gold content thereof. After removal of the gold content, the water insoluble material is collected, dried and reduced with a reducing agent in the presence of fluxes. An impure form of antimony termed "Regulus" carrying a high percentage of antimony is obtained from this residue.

A more detailed description will now be given of the complete process. The ore or a concentrate of it carrying the sulphide of antimony and/or antimony in any other form, together with metallic gold or gold as sulphide or arsenide or telluride or selenide or in any other form, is ground to a suitable size, say to pass through a 100 mesh sieve. The ground ore or the concentrate of it is mixed with one of the salts belonging to the class above referred to. The substances which have been found most suitable for purposes of the inventon are the following:— Sodium sulphate in the commercial form of salt cake, or nitre cake, the sulphates and bisulphates of sodium and potassium, magnesium sulphate, and to a lesser extent calcium sulphate. In the case of the sulphates of sodium and potassium, sulphuric acid may be added, thereby producing bisulphates of these metals in situ. Similarly a mixture of common salt and sulphuric acid, giving sulphates and bisulphates of sodium, may be used.

For instance the ground ore or a concentrate of it may be mixed with sodium sulphate and sulphuric acid in the proportions to complete the following equation:—

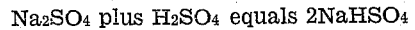

or more or less sulphuric acid than the equation demands or, the finely divided starting material is mixed with common salt and sulphuric acid in proportions as indicated in the following equation:—

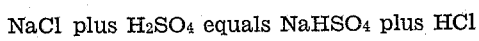

or more or less sulphuric acid than is necessary to balance the equation.

In the experimental work carried out sodium sulphate in the form of "nitre cake" consisting of normal sodium sulphate, acid sodium sulphate and free sulphuric acid was to a large extent used owing to the cheapness of this material. In one experiment a stibnite concentrate having the following composition was worked upon:—

|  | Percent |
|---|---|
| Arsenic | 3.41 |
| Antimony | 42.51 |
| Iron | 12.94 |
| Sulphur | 21.26 |
| Silica | 7.26 |
| Magnesia | 4.12 |
| Lime | 2.17 |
| Nickel | .43 |
| Alumina | 5.13 | and 1 ounce 16 dwts of gold per ton of 2000 lbs.

With 10 lbs. of the above stibnite concentrate in a sufficiently finely divided state to pass a 100 mesh sieve was mixed 20 lbs. of the nitre cake. With an ore or concentrate poorer in antimony and sulphur it has been found that a smaller proportion of nitre cake or the like is required, experiments in connection therewith being more fully described hereinafter.

The mixture of concentrate and nitre cake is then introduced into a suitable furnace which is so arranged that a regulated current of air is made to pass over and through the mass during the roasting process.

Facilities are provided for hand or mechanically rabbling the mass during the roasting from time to time to ensure that all parts come into contact with the current of air.

The amount of air is regulated to a sufficient amount to bring about the oxidation of the sulphides, arsenides, and the antimony. In the case of antimony, besides the oxides salts of antimony are formed.

Under the influence of the heat in the furnace, the moisture contained in the mass is given off first, and the whole of the mass becomes pasty. As the temperature rises the mass gradually becomes dry and lighter in colour. If the temperature is properly adjusted at no time during the roast will any appreciable amount of sulphuric acid or sulphur trioxide be given off. Antimony compounds are at no time given off from the mass except in small quantities, and then chiefly in the form of dust. Towards the end of the furnacing, when the temperature has risen the majority of the arsenic content is evolved as oxide. During furnacing large amounts of sulphur as sulphur-dioxide are given off. At the end of the "roast" if this has been properly carried out, the amount of arsenic left in the mass is small. With a good "roast" the sulphur content of the product, there as sulphide, is nil.

When the "roast" shows no further sulphur, it is withdrawn from the furnace, cooled and preferably leached and washed with water. Rise in temperature takes place when the roasted mass is brought into contact with water, the antimony content of the roast being converted into oxide or oxides of antimony. There goes into solution in the water, small quantities of arsenic, antimony, iron and also normal sulphate of soda $Na_2SO_4$—this latter resulting from the normal sulphate of soda and the acid sulphate of soda contained in the nitre cake used. The water solution of the roast is at most only slightly acid, in many cases it has been quite neutral to litmus, showing that the sodium bisulphate contained in the nitre cake and any free sulphuric acid has entered into the reaction in the furnace.

During the "roast" the antimony contained in the concentrate is converted into oxide and also into sulphate or/and a double sulphate or a mixture of two of these or of all three. The small amount of antimony contained in the water from the leaching of the "roast" may be recovered in a solid form by adding milk of lime or milk of magnesia to the water solution and agitating. The precipitation of the antimony takes place in the cold, but much more rapidly when the solution is heated. Magnesia is preferable to lime as its sulphate is much more soluble in water than calcium sulphate.

The sodium sulphate carried in the water from the leaching of the "roast" may be recovered by evaporation and crystallization. The resultant sodium sulphate crystals on being treated with sulphuric acid gives sodium hydrogen sulphate which may be used in place of the "nitre cake" for mixing with a further quantity of stibnite concentrate, prior to the roasting.

Sulphur dioxide is given off from the mass in the furnace during roasting. This gas after freeing from dust etc. may be used for the manufacture of sulphuric acid.

On treatment of the roasted product from the furnace with water, the bulk of antimony is left as an insoluble residue. This may be collected in some form of filter. The gold contained in the mass can be recovered by any of the usual well known methods.

To obtain a high percentage recovery of gold, should mercury be used, it is necessary either before or during amalgamation to "slime" the water insoluble residue. Unless the mass is "slimed" the percentage of gold recovered is not high—the "sands" carry the balance. In one case, using samples from the same roast, the recovery by amalgamation, without sliming was 61% of the total gold contained in the concentrate. When the second sample from the same roast was "slimed" the recovery of gold was 91%.

With a proper roast—when the sulphur existing as sulphide had been eliminated, no sickening of mercury took place, for it remained perfectly bright and clean.

Small quantities of arsenic, if not present as arsenide, do not affect the mercury during amalgamation. With one roasted product carrying .41% of arsenic, the mercury remained clean. With another roasted product carrying 1.89% arsenic the mercury again remained bright and clean. The oxide of arsenic given off from the roasting mass in the furnace may be condensed in suitable chambers, collected, purified and sold.

It is advisable, but not always necessary to leach the roasted product before amalgamation. The product from the furnace may be made into a thick pulp with water, "slimed" and directly amalgamated, the insoluble portion (after the removal of the amalgam) being collected and treated for the extraction of antimony.

The water insoluble residue, carrying the antimony after collecting and drying may be reduced by carbonaceous matter in the presence of fluxes for the production of "Regulus", which is a crude metallic antimony.

*A typical experimental run using raw ore or concentrate*

The charge placed in the furnace consisted of 10 lbs. concentrate crushed to pass 100 mesh sieve and 20 lbs. nitre cake ($NaHSO_4$) intimately mixed together. During the furnacing the mass was hand "rabbled" every 15 minutes.

At 9 a. m. with a temperature of 140° C. the mixture was charged into the furnace.

At 9:45 a. m. fumes were given off while sulphur was burning and the mass was sticky, the temperature being 160° C.

At 10:30 a. m. copious fumes and sulphur dioxides were evolved and the mass was nearly dry, the temperature being 260° C.

At 11:00 a. m. the mass was dry and white sulphur and arsenic oxide were given off, the temperature was 390° C.

At 12:00 noon the mass was changed from white to yellow, and arsenic oxide was evolved, the temperature being 375° C.

At 1:00 p. m. arsenic oxide was given off together with small amounts of sulphur dioxide. The temperature was 380° C.

At 2:00 p. m. arsenic was given off, the temperature being 390° C.

At 3:00 p. m. a small amount of arsenic was given off and the temperature was 380° C.

At 4:00 p. m. only a very small amount of arsenic was evolved, the temperature then being 370° C.

When withdrawn from the furnace, the mass was pale yellow and the product weighed 21¾ lbs. The time of furnacing had been seven hours and the mass was sampled when cold.

20 assay tons were taken for amalgamation, and it was found that the mercury did not sicken, but remained perfectly bright. Gold recovered by amalgamation equalled 84% of the total gold contained in the concentrate.

A second amalgamation using 20 assay tons gave a gold recovery of 87.2%.

The mass was "slimed" during each amalgamation.

The water insoluble mass, after removal of amalgam, was collected, dried and reduced by powdered coal in the presence of fluxes. A button of "Regulus" was obtained which gave on assay the following figures:—

| | Per cent |
|---|---|
| Antimony | 94.72 |
| Arsenic | .43 |
| Iron | 3.81 |
| Nickel | .37 |

The antimony carried in the "Regulus" was equal to 87.2% of that contained in the original concentrate. It has been found best to charge the mixture of concentrate and nitre cake into the furnace at a temperature of from 100 degs. C. to 150 degs. C. The final and maximum temperature of the mass in the furnace should not exceed 450 degs. centigrade to 500 degs. centigrade. Above this temperature a further change takes place making it somewhat difficult to extract the gold by amalgamation.

The following is a typical experimental run using "matte".

The charge placed in the furnace consisted of 2 lbs. matte of 100 mesh and 4 lbs. nitre cake intimately mixed together.

During the furnacing the mass was rabbled every fifteen minutes.

At 8:00 a. m. the mixture was charged into the furnace, the temperature being 120° C.

At 9:00 a. m. the mass was sticky and some fumes were evolved. The temperature was 110° C.

At 10:00 a. m. the mass was dry and some fumes were given off, the temperature being 230° C.

At 11:00 a. m. the mass was dry and no appreciable fumes were given off, the temperature being 370° C.

At 12:00 noon the mass was dry and traces of arsenic were given off. The temperature was 460° C.

At 1:00 p. m. air was freely admitted to the mass which was at a temperature of 420° C.

At 2:00 p. m. air was still freely admitted to the mass and the temperature was 450° C.

At 3:00 p. m. the air was still freely admitted to the mass and the temperature was then 460° C.

Finally at 4:00 p. m. with the air still being freely admitted to the mass, no fumes were given off, but the temperature was 440° C.

At this time namely 4:00 p. m. the mass was withdrawn from the furnace, and the roast was found to be reddish in color and to weigh 4½ lbs.

The time consumed in roasting the mass was 8 hours.

The mass when cooled was sampled, and 5 assay tons were taken for amalgamation.

The mercury did not "sicken", while the gold recovered by amalgamation equalled 96.6% of total gold content.

A second amalgamation gave a 95.9% gold recovery.

The mass was "slimed" during each amalgamation.

The water insoluble mass after amalgamation, was collected, dried and reduced by carbonaceous matter in the presence of fluxes—the button of regulus obtained carried antimony equal to 91.2% of the total antimony content of the matte.

What I claim is:—

1. The process for separating and recovering gold and antimony contained in a starting material consisting of sulphide of antimony ores and more or less concentrated and oxidized forms thereof, which consists in comminuting said starting material into a finely divided condition, mixing said finely divided starting material with a salt of the class comprising the sulphates and bisulphates of such alkaline earth metals as calcium and magnesium and of such alkali metals as sodium and potassium in suitable proportions, subjecting the mixture to a roasting step in a furnace while regulating the supply of air thereto, leaching the resulting roasted mass with water and treating the insoluble residue in known manner to recover the gold therein.

2. The process according to claim 1 wherein the air supplied to the mixture during the roasting step is conducted over and through the heated mixture, simultaneously rabbling the mixture in order to expose all portions of the mixture to the oxidizing action of the air current, and continuing the oxidation until all the sulphides, arsenides and antimony have been oxidized and the sulphur content of the roast in the form of sulphide is completely absent.

3. A process according to claim 1, wherein the solution obtained by leaching the roasted ore with water is treated by adding thereto one of the class of aqueous suspensions comprising milk of lime and milk of magnesia, and then agitating the solution in order to precipitate antimony and recover the same in solid form.

4. A process according to claim 1, wherein the solution obtained by leaching the roasted ore with water is treated by adding thereto one of the class of aqueous suspensions comprising milk of lime and milk of magnesia, heating the solution, and then agitating the same in order to precipitate antimony and recover the same in solid form.

5. The process according to claim 1, wherein the starting mixture and the added salt are fed into the roasting furnace at a temperature ranging from normal atmospheric temperature up to 150 degrees C., and wherein the maximum temperature of the furnace subsequently during the roasting step is held down to the limits ranging between 450° C., and about 500° C.

6. The process according to claim 1, wherein the added salt in the form of a bisulphate may be formed in situ by mixing with the finely divided starting material a mixture of sulphuric acid and one of the class of sulphates such as the sulphates of sodium, potassium, calcium and magnesium.

7. The process according to claim 1, wherein the added salt in the form of a sulphate or bisulphate of sodium may be formed in situ by mixing with the finely divided starting material a mixture of common salt and sulphuric acid.

HENRY WILLIAM COUPE ANNABLE.